Oct. 16, 1923.
J. A. DIENNER
REVERSING MECHANISM
Original Filed March 13, 1919
1,471,148
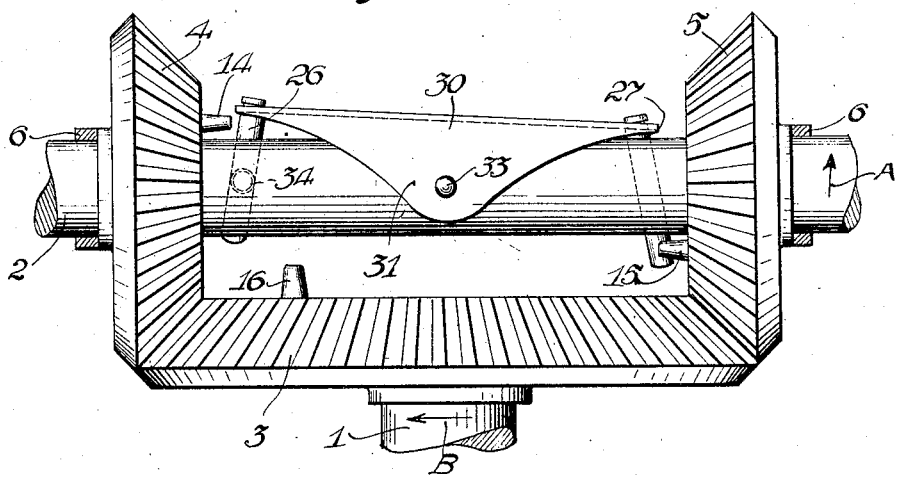
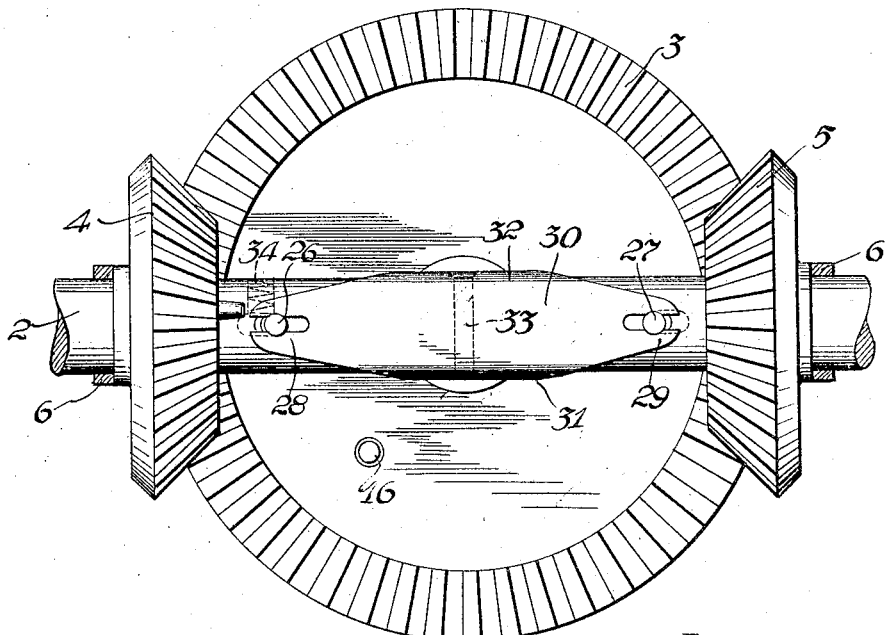
Inventor
John A. Dienner
By Brown Boettcher Dienner
Attorneys Patented Oct. 16, 1923.

1,471,148

UNITED STATES PATENT OFFICE.

JOHN A. DIENNER, OF CHICAGO, ILLINOIS, ASSIGNOR TO WALTER J. CONLON, OF CICERO, ILLINOIS.

REVERSING MECHANISM.

Original application filed March 13, 1919, Serial No. 282,370. Divided and this application filed January 25, 1922. Serial No. 531,595.

*To all whom it may concern:*

Be it known that I, JOHN A. DIENNER, a citizen of the United States, residing at Chicago, in the county of Cook and State of Illinois, have invented a certain new and useful Improvement in Reversing Mechanisms, of which the following is a full, clear, concise, and exact description, reference being had to the accompanying drawings, forming a part of this specification.

My invention relates to reversing mechanisms for automatically reversing the direction of rotation of a driven member at regular intervals, driven by a driving shaft operating continuously in one direction. The present application is divisional of my prior Patent No. 1,409,531, issued March 14, 1922.

Reversing mechanisms of the above general description are used in connection with washing machines, churns, and the like.

My improved reversing mechanism is primarily adapted for use in connection with washing machines, wherein the washing drum is rotated a number of times in one direction and then a number of times in the opposite direction, to prevent wadding of the clothes inside the drum.

I am aware that reversing mechanisms of this general description have been provided heretofore in the art and have observed that such devices have been generally of an expensive and complex construction, and many of them subject to failure to operate positively at all times.

The particular type to which my invention relates employs the power of the driving shaft to operate the clutch shifting mechanism so that positive reversal is always secured.

Devices of this general character have heretofore been known, but the construction of the same has been complicate and difficult both because of the machining operations required and the cost of assembly.

My invention aims to provide a reversing mechanism of the simplest character consistent with strength and durability.

In accordance with the teachings of my invention I provide a pair of spaced bevel pinions loosely mounted upon the driving shaft and constantly in mesh with a bevel gear connected to rotate in unison with the driven member; clutching means of simple and durable construction having a swinging lever associated with the driving shaft and provided with clutching portions or pins engageable with the bevel pinions, the lever being periodically actuated upon the rotation of this bevel gear to alternately clutch first one and then the other of the spaced bevel pinions to the driving shaft. Power is thereby alternately transmitted from the driving shaft to the driven member first thru one bevel pinion and then thru the other bevel pinion, rotating the bevel gear and consequently the driven member a number of times in one direction and then a number of times in the opposite direction.

In order that those skilled in the art may be fully acquainted with the nature and scope of my invention I shall describe a specific embodiment of the invention in connection with the accompanying drawings which form a part of the present specification, and wherein:

Figure 1 is a plan view of the reversing mechanism embodying my invention; and

Figure 2 is a front elevational view of the same.

In the construction illustrated in these figures, I have provided for reversing the direction of rotation of the shaft 1 at regular intervals, automatically and without in any way affecting the rotation of the driving shaft 2, which driving shaft 2 is adapted for operating continuously in one direction. A bevel gear 3 is splined or otherwise suitably fixed upon the end of the shaft 1.

As will be hereinafter more fully explained, the bevel gear 3 and consequently the shaft 1 is driven for a definite number of revolutions in one direction and then a definite number of revolutions in the opposite direction. In machines wherein it is desirable that the direction of rotation of a driven member be periodically reversed, such as for example, in washing machines, in connection with which my invention is primarily adapted, the washing drum is positioned on or otherwise connected to rotate in unison with the driven shaft 1.

The driving shaft 2, which is adapted to be driven continuously in one direction as by means of a suitable motor, bears two loosely mounted bevel pinions 4 and 5, which bevel pinions mesh with the bevel gear 3 at all times. The bevel pinions 4 and 5 may be held against endwise movement along the driving shaft 2 by collars 6 or the like.

The alternate clutching of the pinions 4 and 5 to the driving shaft 2 is accomplished by means of a pivoted yoke member 30, pivoted to the driving shaft 2, and its cooperating clutch pins 26 and 27. These clutch pins are adapted to engage pins 14 and 15 respectively, carried upon the inner opposed faces of the bevel pinions 4 and 5 respectively. The pins 14 and 15 may be removable or formed integral with the inner opposed faces of the pinions 4 and 5, and project inwardly therefrom so as to be in the path of rotation of the particular clutch pin 26 or 27 projecting from the driving shaft 2. These clutch pins 26 and 27 are arranged in suitable diametrical bores provided in the driving shaft 2 adjacent the inner faces of the bevel pinions 4 and 5. An annular groove is provided adjacent one end of each of the clutch pins 26 and 27, the reduced neck portions provided by these annular grooves engaging in the slotted ends 28 and 29 respectively of the pivoted yoke member 30. The diametrical bores provided in the driving shaft 2 for the clutch pins 26 and 27 are not strictly diametrical, but extend through the shaft at a slight angle as shown in Figure 1 in order that when either of the pins 26 or 27 is projected into the position of the pin 27 the pin (14 or 15) on the corresponding bevel pinion will be engaged thereby and such bevel pinion clutched to the shaft 2. Movement of the pin 26 or pin 27 as the case may be, into the position of the pin 26 (Figure 1) by moving the pin through the shaft 2 at a slight angle, causes the end of the pin connected with the yoke member 30 to clear the pins 14 or 15 during rotation of the driving shaft 2.

The yoke member 30 is provided with a pair of parallel extending portions 31 and 32 which embrace the driving shaft 2. A transverse pin 33 extends diametrically through the parallel extending portions 31 and 32 of the yoke member and through the driving shaft 2, thereby pivotally mounting the yoke member upon the driving shaft.

The swinging of the yoke member 30 about its pivot 33 is accomplished automatically by means of a shifter post 16 projecting inwardly from the bevel gear 3. Assuming that power is being transmitted from the shaft 2 to the shaft 1 by way of the bevel pinion 5, the direction of rotation of the shifter post 16 about the axis of the shaft 1 will be as indicated by the arrow B, assuming a direction of rotation A for the driving shaft 2. After a predetermined number of revolutions of the shaft 1 in this direction, the shifter post engages the raised end of the yoke member 30. The yoke member will thereupon be swung about its pivot 33, raising the clutching pin which was previously driving and releasing said pin from its corresponding bevel pinion, and lowering the opposite clutching pin. This opposite pin 26 will engage the pin 14 on the other bevel pinion 4, and the shaft 1 will thereafter be driven through this bevel pinion for a predetermined number of revolutions in the opposite direction. At the end of such predetermined number of revolutions the shifter post 16 engages the raised or projecting end of the yoke member 30 and repeats the foregoing unclutching and clutching operations for driving the shaft 1 in the opposite direction. The engagement of the shifter post 16 with either end of the yoke member 30 begins below or above the horizontal axis of the shaft 1; that is the contact begins above or below this axis and terminates substantially at the axis.

A spring 34, arranged in the driving shaft 2, normally engages the clutch pin 26 to maintain the pin 26 and consequently the pin 27, through the yoke member 30, positively in each position, preventing shifting of the yoke member 30 except by the action of the shifter post 16. The short sturdy clutch pins 26 and 27 are well able to withstand any strain connected with the operation of clutching driving shaft 2 to the bevel pinions 4 and 5, the yoke member being merely periodically actuated by the shifter post 16 to shift the clutch pins 26 and 27 into and out of operative position. This yoke member is subjected to comparatively small stress and consequently, can be made of light inexpensive construction.

I claim:

1. In combination, a first shaft, a pair of pinions on said shaft, a second shaft, a gear on said second shaft meshing with said pinions, one of said shafts driving and the other being driven, and clutch mechanism adapted to alternately clutch said pinions to said first shaft, said clutch mechanism comprising a rocking member extending along the outside of and pivoted directly to said first shaft at an angle to the axis thereof, said member being alternately rocked about its pivot in effecting the clutching and unclutching of said pinions.

2. In combination, a first shaft, a pair of pinions on said shaft, a second shaft, a gear on said second shaft meshing with said pinions, clutch mechanism adapted to alternately clutch said pinions to said first shaft, said clutch mechanism comprising a driving member extending along the outside of and pivoted directly to said first shaft, and means for rocking said driving member about its pivot in clutching and unclutching said pinions.

3. In combination, a driving shaft, a driven shaft, a pair of bevel pinions loosely mounted on said driving shaft, a bevel gear meshing with said bevel pinions and mounted on said driven shaft, clutch mechanism adapted to alternately clutch said bevel pinions to said driving shaft, said clutch mechanism comprising a driving member defining a channel through which said shaft is adapted to extend, and means carried by the bevel gear on said driven shaft for rocking said channel to alternately clutch said bevel pinions to said driving shaft.

4. In combination, a drive shaft, a pair of driving members on said shaft, a driven mechanism operatively connectible with said driving members, clutch mechanism adapted to alternately clutch said driving members to said drive shaft, said clutch mechanism comprising a lever straddling said drive shaft and pivoted thereto, and means carried by said driven mechanism for actuating said lever.

5. In combination, a shaft, bevel pinions, a yoke-shaped lever embracing said shaft and pivoted thereto, a bevel gear cooperable with said pinions, means moving with said bevel gear for alternately rocking said lever, and means for effecting an alternate clutching engagement between said lever and said bevel pinions.

6. In combination, a shaft, bevel pinions, a bevel gear cooperable with said pinions, and clutch mechanism adapted to alternately clutch said pinions to said shaft, said clutch mechanism comprising a driving member extending along the outside of and pivoted to said drive shaft, means at the ends of said lever having guided engagement with said shaft, and means moving with said bevel gear for causing said driving member to alternately clutch said pinion to said shaft.

7. In combination, a pair of shafts, a bevel gear fixed upon one of said shafts, a pair of bevel pinions meshing with said bevel gear and loosely mounted upon the other of said shafts, clutch pins mounted in said shaft for clutching either of said bevel pinions thereto, and a rocking member extending along the outside of said latter shaft and operative to shift said clutch pins into and out of operative position, and means moving with said bevel gear for periodically cooperating with said rocking member for shifting said clutch pins alternately into and out of operative position.

8. In combination, a shaft, bevel pinions, a bevel gear cooperable with the pinions, clutch pins supported by said shaft for clutching either of said pinions thereto, a yoke-shaped rocking member straddling said shaft and pivoted thereto, said rocking member actuating said clutch pins, and means for periodically swinging said rocking member to shift said clutch pins alternately into and out of operative position.

In witness whereof I hereunto subscribe my name this 12th day of January, 1922.

JOHN A. DIENNER.